United States Patent [19]
Beeler et al.

[11] Patent Number: 5,712,980
[45] Date of Patent: Jan. 27, 1998

[54] DATA ARRANGEMENT FOR AN APPARATUS CONNECTABLE TO A COMMUNICATION NETWORK, AND PROCESS FOR GENERATING THE DATA ARRANGEMENT

[75] Inventors: Heinz Beeler, Ebikon; Gerhard Brun, Luzern; Alfred Moertlseder, Zug, all of Switzerland

[73] Assignee: Landis & Gyr Technology Innovation AG, Switzerland

[21] Appl. No.: 467,102

[22] Filed: Jun. 6, 1995

[30] Foreign Application Priority Data

Aug. 4, 1994 [EP] European Pat. Off. .............. 94112236

[51] Int. Cl.$^6$ ..................................................... G06F 13/00
[52] U.S. Cl. ...................................... 395/200.15; 395/700
[58] Field of Search .......................... 395/200.01, 200.03, 395/200.09, 200.15, 600, 650, 700, 800, 100, 118, 133; 364/130, 134

[56] References Cited

U.S. PATENT DOCUMENTS

| | | | |
|---|---|---|---|
| 5,280,610 | 1/1994 | Travis, Jr. et al. | 395/600 |
| 5,421,015 | 5/1995 | Khoyi et al. | 395/650 |
| 5,448,726 | 9/1995 | Cramsie et al. | 395/600 |
| 5,499,371 | 3/1996 | Henninger et al. | 395/700 |
| 5,519,867 | 5/1996 | Moeller et al. | 395/700 |

FOREIGN PATENT DOCUMENTS

| | | |
|---|---|---|
| 0522590 | 1/1993 | European Pat. Off. . |
| 0557681 | 9/1993 | European Pat. Off. . |
| WO9216905 | 10/1992 | WIPO . |
| WO9324870 | 12/1993 | WIPO . |

OTHER PUBLICATIONS

Fabian et al., "Object Oriented Structuring of Real Time Systems", *Proceedings of the 31st IEEE Conference on Decision and Control*, Dec. 16–18, 1991, pp. 2529–2530.

Eychenne et al., "The Use of Object Groups to Implement Dependability in a Process Control Supervision System", *The 23rd International Symposium on Fault-Tolerant Computing*, Jun. 22–24, 1993, pp. 660–665.

*Primary Examiner*—Alpesh M. Shah
*Attorney, Agent, or Firm*—Greer, Burns & Crain, Ltd.

[57] ABSTRACT

A data arrangement for an apparatus connectable to a communication network comprises data points (6.1..6.n) arranged in an apparatus and also a characterization of the apparatus. In a data point 6.k, with an index k of 1 to n, dynamic process information is storable. With apparatus connected, the data points (6.1..6.n) are accessible over the communication network for a station connected to the communication network for the reading and/or changing, in which also a single data point (6.k) is accessible. The characterization is a static description of objects of the apparatus in which a single data point (6.k) or also a group of data points (6.k) are objects of the apparatus. The data arrangement creates the precondition that in the operation of the apparatus an access is feasible to a data point (6.k) with a minimum of data traffic on the data network. The available characterization makes possible, further, a data-controlled realization of a user program.

15 Claims, 3 Drawing Sheets

5,712,980

DATA ARRANGEMENT FOR AN APPARATUS CONNECTABLE TO A COMMUNICATION NETWORK, AND PROCESS FOR GENERATING THE DATA ARRANGEMENT

The present invention generally relates to a data arrangement for an apparatus connectable to a communication network, and to a process for generating the data arrangement.

The term data arrangement is meant here to be an arrangement with several data elements, in which each data element comprises a certain storage location and a constant or variable value stored in the storage location.

Such data arrangements are used advantageously in routing systems in which a routing point or station and several apparatuses are connected with one another over a communication network. An example of a routing system is a building automation installation in which various detection, control and regulating apparatuses exchange data with a building control station over a communication network.

For the storing of process magnitudes, such an apparatus has at its disposal generally several local variables, which have a data structure corresponding to their assignment. Further, there is also allocated to a variable a meaning or terminology referred to the apparatus.

It is a known practice (as described in Abstract Syntax Notation One, ISO 8824; Basic Encoding Rules, ISO 8825), for the exchanging of process magnitudes in a communication network, to use a protocol which comprises the value, data type, physical unit and significance of the process magnitudes. In this manner, a relatively large data traffic is provided on the communication network. If, for example, a change of a process magnitude occurs in an apparatus and if the change is conveyed over the communication network to a central control station, then the transferred protocol comprises not only the value of the process magnitude, but additional information data for the allocation, use or interpretation of the value in the central control station. The expenditure for the preparation, transmission and interpretation of the protocol is great. A change relating to the process magnitudes of the functionality of the apparatus requires, as a rule, also an extensive change in the control station.

Underlying the invention is the problem of creating a data arrangement for an apparatus connectable to a communication network, by which process magnitudes of the apparatus are simply integratable into a station connected to the communication network in such manner that meaning and utilization possibilities of the process magnitudes in the station are largely known and the process magnitudes, therefore, are pinpointedly readable and/or variable through the station. There is a problem in accomplishing the above during the operation of the apparatus with only minimal data traffic between the apparatus and the communication network.

Accordingly, it is a primary object to provide an improved data arrangement which solves the aforementioned problems.

Other objects and advantages will become apparent from the following detailed description, in conjunction with the attached drawings, in which.

DETAILED DESCRIPTION

Figure 1:
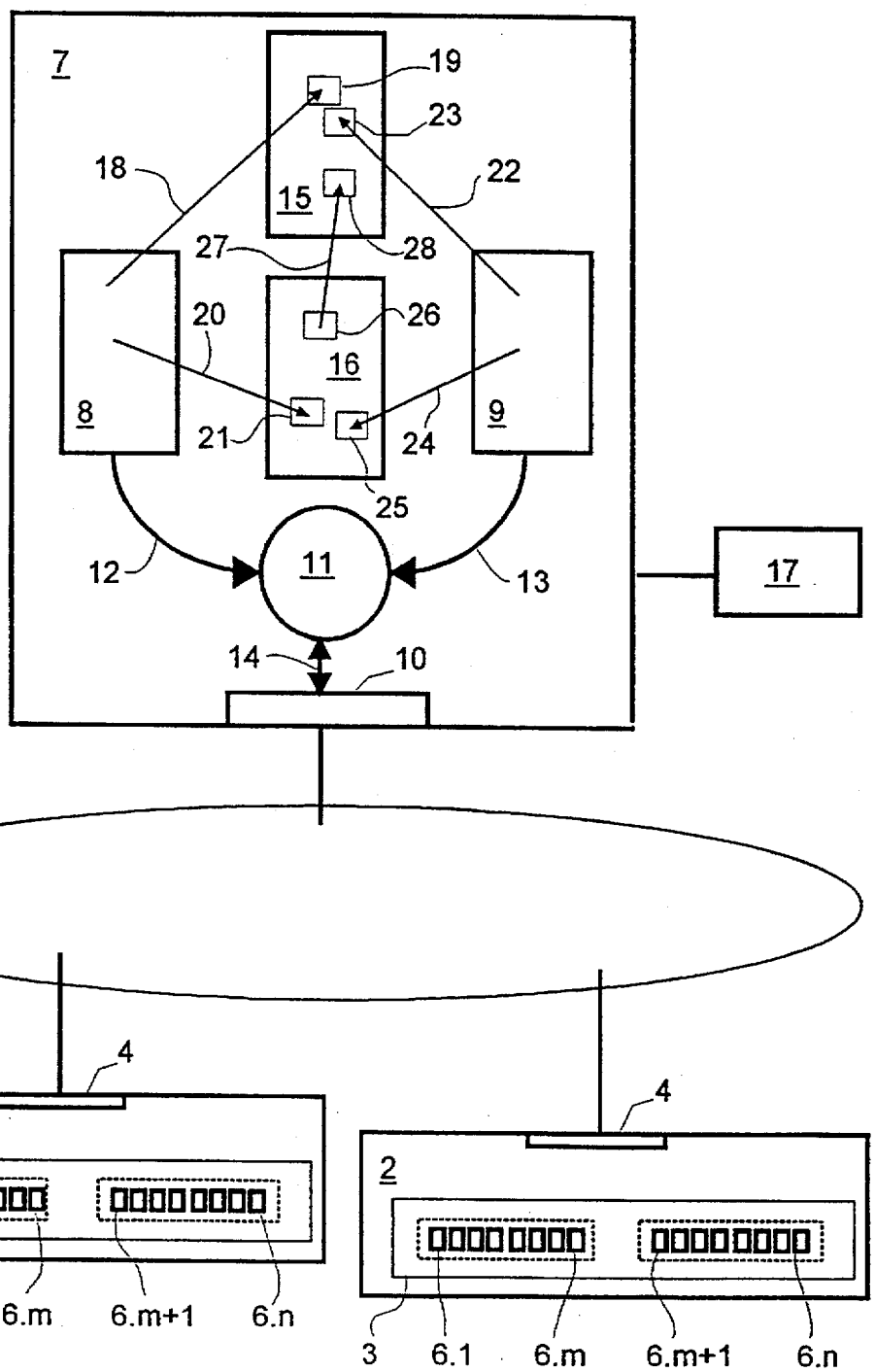
FIG. 1 is a block diagram of a communication network with two apparatus connected to the communication network and of a further connected station.

First and second apparatus 1 and 2 are shown in FIG. 1 and each has a storage module 3 and an interface unit 4. The two apparatus 1 and 2 are each connected to a communication network 5 via the corresponding interface unit 4.

The storage module 3 has a first number n of data points 6.1 to 6.n, of which a second number of data points 6.1 to 6.m are distinguished advantageously with the feature that the functionality of the apparatus 1 or 2, respectively, is configurable by the data points 6.1 to 6.m.

A station 7 has a characterization 8 of objects of the first apparatus and a further characterization 9 of objects of the second apparatus. Further, the station 7 has an interface unit 10 and a processor 11, in which the processor 11 is coupled to a first data channel 12 and a second data channel 13 for reading the characterization 8 and the characterization 9, respectively. The processor 11 is connected via a third data channel 14 to the interface unit 10, which is in turn connected to the communication network 5.

The station 7 advantageously has a text catalog 15 and a units catalog 16. The mass units used in the first apparatus 1 or in the apparatus 2 are stored advantageously in the units catalog 16 and are retrievable via pointers for the processor 11. Points are designated in the literature also as pointers or reference. Advantageously, a mass unit is stored in a data connection of the units catalog 16, the mass unit or the data connection being multiply referenceable with the mass unit, if needed, by pointer(s). The data connection is describable, for example, in the program language C as "Structure". The Units catalog 16 has, for example, a data connection each for the SI-units Pascal, degrees Celsius, watts, and lux if the apparatuses have process magnitudes for pressure, temperature, power and illumination, respectively. In the data connection of a mass unit, attributes are also advantageously stored which establish the resolution and the representation format of the value of the data point described, to which the mass unit is allocated. Advantageously, a name of the mass unit is stored in the text catalog 15 and the data connection of the mass unit has, instead of the name, a pointer to the name.

If need be, the station 7 has an input/output apparatus 17 for a person-to-machine interface. The input/output apparatus 17 is, for example, a display terminal.

In the text catalog 15 there are stored texts retrievable via pointers for the processor 11, in which arrangement a text of the text catalog 15 is stored, for example, as sign-chain (string) and is stored, if need be, in a data connection. The data connection advantageously has several manners of writing or abbreviated forms of the text. If, for example, a first manner of writing of a text is "Sunday", then "Su" would be a second manner of writing of the text. The text or the data connection with the text is multiply referenceable by pointers. Advantageously, the text catalog presents the texts of a person/machine interface between a user and the station 7 or the first apparatus 1 or the second apparatus 2. For the person/machine interface, the suitable manner of writing of the text is more advantageously choosable from the data connection.

Through the fact that the texts of the person/machine interface are deposited together as a unit in the text catalog 15, the text catalog 15 is the sole language-dependent component of the apparatus 1 or 2, respectively and of the station 7; a laying-out of the station 7 for different operator languages is thereby achievable in a simple manner by changing of the text catalog 15, in which system the station 7, in a further form of execution, can also simultaneously have several translations of the text catalog 15.

In the interest of better understanding, in FIG. 1 not all of the pointers to texts or mass units present in station 7 are represented. The characterization 8, in a representation by way of example, has a first pointer 18 to a first text 19 of the text catalog 15 and a second pointer 20 to a first mass unit 21 of the units catalog 16. The characterization 9 has, in the representation, a third pointer 22 to a second text 23 of the text catalog 15 and a fourth pointer 24 to a second mass unit 25 of the units catalog 16. Further, in the representation, a third mass unit 26 or the data connection of the third mass unit 26 has a fifth pointer 27 to a third text 28 of the text catalog 15. In an advantageous execution of the characterization 8 or 9, the pointer 18 or 20 or 22 or 24 is a storage address.

An advantageous data arrangement for the apparatus 1 or 2 connectable to the communication network 5 comprises data points 6.1 to 6.n arranged in the apparatus 1 or 2, respectively, and also the characterization 8 or 9 of the apparatus 1 or 2. In a data point 6.k with the index k of 1 to n, dynamic process information, is storable. By dynamic process information it is meant here a process magnitude which is variable in the operation of the apparatus 1 or 2. The dynamic process information is, for example, a pressure of a fluid, a measured temperature, an operating state of the apparatus 1 or 2, a setting magnitude a running time or a parameter for the configuration of the apparatus 1 and 2. The data point 6.k is designated in the literature also as variable. With apparatus 1 or 2 connected, the data points 6.1 to 6.n are accessible for reading and/or changing over the communication network 5 for the station 7 connected to the communication network 5. In such system, advantageously also, a single data point 6.k is readable and/or changeable from the station 7.

The characterization 8 or 9 is a static description of objects of the apparatus 1 or 2, in which context the term static means the characterization 8 or 9 in the operation of the apparatus 1 or 2, respectively, is not variable, but constant. The characterization 8 or 9 is a logically correlated unit which comprises static descriptive data of the objects of the apparatus 1 or 2, in which the characterization 8 or 9 is stored in a storage medium, for example in a programmable read only memory (PROM) or on a magnetic or optical storage plate and is interpretable by a processor.

An object of the apparatus 1 or 2 is a single data point 6.k of the apparatus 1 or 2 accessible over the communication network 5. Further, in the characterization 8 or 9 several of the data points of the apparatus 1 or 2 accessible over the communication network 5 are groupable to form a logically coordinated unit or a structure of several data points 6.i to 6.j, in which a data point 6.k can be allocated generally to several different configurations of the apparatus 1 or 2.

An advantageous process for the formation of the data arrangement with the data points 6.1 to 6.n of the apparatus 1 has theoretically the following five steps:

A first step in which each of the n data points 6.1 to 6.n is allocated to a predetermined data point type, according to which a data point 6.k is an object of the apparatus 1 and also of the characterization 8 to be generated.

If need be, a second step in which several objects are grouped into a further object of the apparatus 1 or of the characterization 8 to be generated.

A third step, in which an object of the characterization 8 to be generated is allocated to a predefined class.

A fourth step, in which for the generation of the characterization 8 for the objects of the characterization 8 to be generated, there is formed in each case an instance of the class corresponding to an object.

A fifth step, in which the characterization 8 is distributed.

Figure 2:
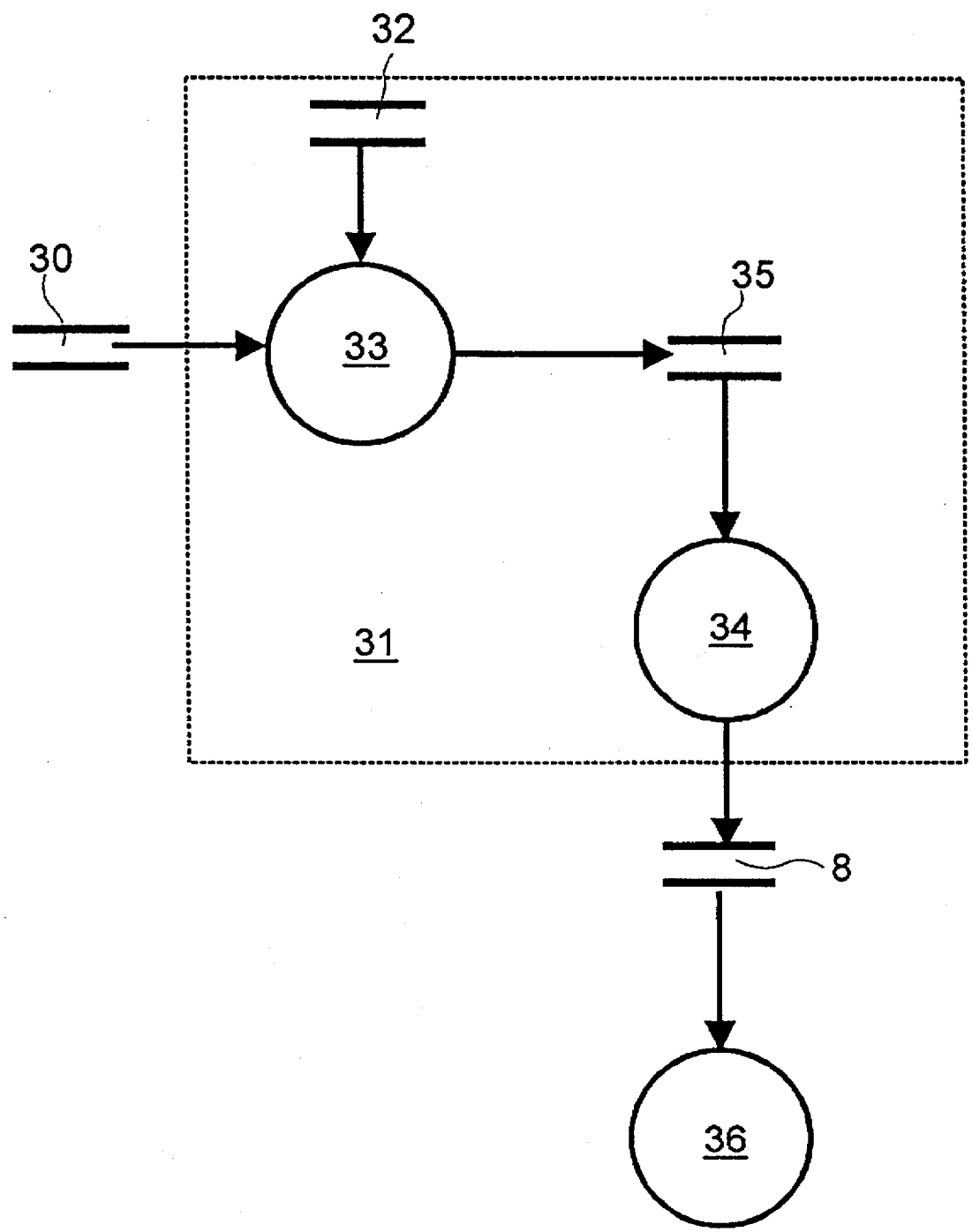
FIG. 2 is a theoretical data flow program for the generating of a characterization of data points of the apparatus.

In FIG. 2, 30 signifies a source data set of the characterization 8 and 31, a compiler system by which from the source data 30 in an advantageous manner the characterization 8 is generatable. The compiler system 31 has a class library 32 and further comprises a first activity 33 and a second activity 34. The first activity 33 is the execution of a compiler-linker program which reads the source data set 30, and with the aid of the class library 32, generates a runnable intermediate program 3 5, which generates the characterization 8 available for an application program 36. The characterization 8 is physically distributable in a known manner, for example on a PROM, or a diskette or by a transmission over a data network. In the example of execution of FIG. 1, the application program 36 is the activity 11 of the station 7.

The compiler-linker program is advantageously a purchasable system, in which the chosen program language advantageously supports a programming based on objects (object oriented programming, OOP). The program language is, for example, C++ (Bjarne Stroustrup: C++, Addison-Wesley).

The class library 32 written in the programming language used has the classes available for the objects of the characterization 8 or 9.

A data point 6.k (FIG. 1) with k of 1 to n, has a certain data point type which is selectable from a predetermined number of data point types. The number or amount of the available data point types advantageously has at least the following data point types: a type "analog value", a type "binary value", a type "status value", a type "bit amount", a type "time point", a type "time difference" and a type "block".

With the exception of the data point type "block", the data point type is advantageously a structured data type which has a first field and a second field. The second field has the actual value of the process information of the data point 6.k. The second field of the data point type "analog value" is, for example, designated in program language C++ as "float", while, for example, in the program language Pascal the second field of the data point type "binary value" is designated as "Boolean", the second field of the data point type "status value" is "symbol type", the second field of the data point type "bit amount" as "set" and the second field of the data point types "time point" and "time difference" as designated as "record". If an operation "read" of the data point 6.k and an operation "write" are referred to the data point 6.k to the station 7 or the communication network 5, then the first field in the "read" of the data point 6.k has a state of the data point 6.k and in the "writing" onto the data point 6.k a command. The field with the state makes possible the indication of a certain error state referred to the data point 6.k or the apparatus 1 or 2, while the state of the data point 6.k is variable with the command.

The data point type "block" comprises a predetermined number of bytes of storage place and serves for the representation of data in a freely choosable data format, which is usable here as a further unstructured byte chain. The data point type "block", demands, as compared to the other choosable data point types, rather much storage space, for example 20 bytes.

By virtue of the fact that the choosable amount (or number) of the data point types is restricted, there is prevented an unsurveyable multiplicity of types with the data points 6.1 to 6.n, the data point "block" making possible a substantially free data format for a data point 6.1.

The representation and, above all, also the address order of the data points 6.1 to 6.n are laid out advantageously for the demands of the communication network 5—for example on the PROF1 bus (Process Field Bus, DIN 19 245).

The class library 32 (FIG. 2) has a class each for the selectable data point types, by which the data point 6.k allocated to the data point type is describable. The class Library has, therefore, advantageously a class "analog value class" for the data point type "analog value", as class "binary value class" for the data point type "binary value," a class "status value class" for the data point type "status value", a class "bit amount class" for the data point type "bit amount", a class "time point class" for the data point type "time point", a class "time difference class N " for the data point type "time difference" and a class "block class" for the data point type "block".

With the exception of the class "block class", a class advantageously has at least the following five attributes:

A first attribute "address", by which an address of the data point 6.k is established A second attribute "name", by which a designation of the data point 6.k is established.

A third attribute "lower limit" and a fourth attribute "upper limit", by which there is established the value range lying between the third attribute and the fourth attribute of the data point 6.k.

A fifth attribute "default" by which a standard value or a starting value of the data point 6.k is established.

A sixth attribute "masking", by which the data point 6.k is allocated to a group, in which the group is selectable from a predetermined number of groups and the data point 6.k, if need be, can be allocated to several groups. By the sixth attribute data points which form a unit logically or for a certain function are collected into a group.

Advantageously, the number of groups comprises a first group "S" with desired values of the apparatus 1, a second group "V" with measuring or control magnitudes of the apparatus 1 and a third group "D" with data points which are important for a diagnosis on the apparatus 1. By the attribute "masking", the data points 6.1 to 6.n for different predetermined operating views are groupable in an advantageous manner.

If need be, the class presents, further:

A seventh attribute "unit", by which a mass unit of the data point is established.

An eighth attribute "access right", by which access rights of the application program 36 to the data point—6.k are established. The access rights permit, according to the type of the application program 36, a multiply graduated right(s) for the reading and/or altering or overwriting of a value, the rights being choosable, for example, between "normal", "low-privileged" and "highly privileged".

A ninth attribute "Features", by which special capabilities or properties of the data point 6.k are established. A first special capability is the possibility of forwarding a value change as event to a superordinated system and a second special capability is the possibility of forwarding an alarm to a superordinated system.

A tenth attribute, "Configuring", which establishes whether or not the data point 6.k is usable for the configuration of the function of apparatus 1.

The class "block class" has advantageously the first attribute "address", the second attribute "name" and the tenth attribute "configuring".

Figure 3:
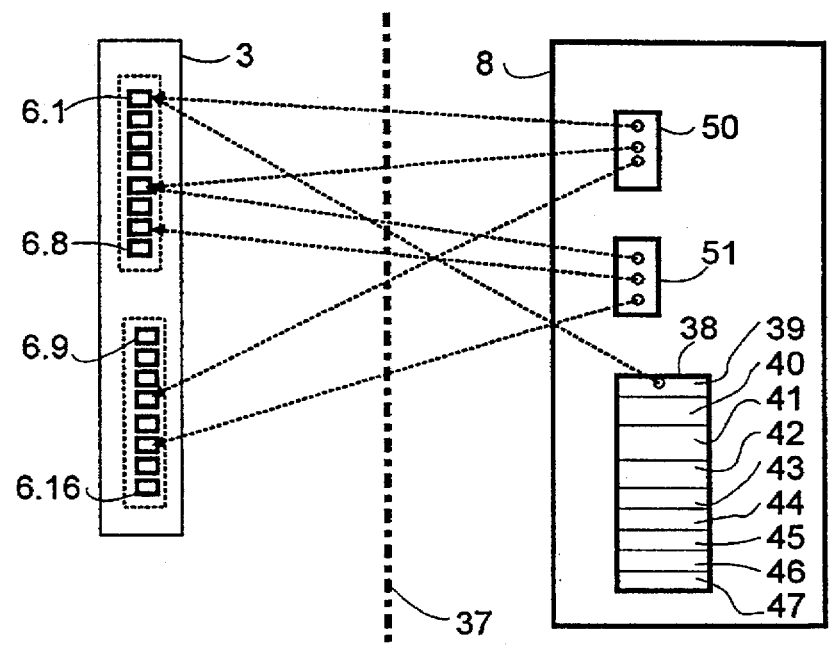
FIG. 3 illustrates an example of execution with an advantageous data arrangement for the apparatus; and, FIG. 4 illustrates a further representation of the data arrangement.

The advantageous data arrangement represented in FIG. 3 of the first apparatus 1 of the apparatus has the data points 6.1 to 6.16 and the characterization 8, in which the characterization 8 is separated from the data points 6.1 to 6.16, which is symbolically represented by a separating line 37. The characterization has a first data set 38 with descriptive data of the first data point 6.1.

In the example of execution the first data point 6.1 has the data point type "analog value". Advantageously the first data set 38 is realized by an instance of the class "analog value class". The first data set 38 comprises:

first descriptive data 39 which establish an address of the data point 6.1 and therewith also reference the data point 6.1;

second descriptive data 40, by which the data type of the data point 6.1 is established, third descriptive data 41, by which a designator of the data point 6.1 is established;

fourth descriptive data 42, by which the value range of the data point 6.1 is established;

fifth descriptive data 43, by which the standard value of the data point 6.1 is established;

sixth descriptive data 44, by which access rights to the data point 6.1 are established;

seventh descriptive data 45, which indicate that the data point 6.1 is capable of forwarding an accomplished value change to the superordinated station 7 (FIG. 1)

eighth descriptive data 46 which indicate that the data point 6.1 is necessary for the configuration of the functionality of the apparatus 1 and ninth descriptive data 47, by which the mass unit of the data point 6.1 is established.

Because of the fact that the characterization 8 has the fifth descriptive data 43 and the eighth descriptive data 46, the functionality of the apparatus 1 is configurable in an advantageous manner. The functionality of the apparatus 1 is given by the standard value of the data points 6.1 to 6.m predetermined or necessary for the configuration (FIG. 1), whereby the functionality of the apparatus 1 is configurable, as the corresponding standard values of the characterization 8 are stored by the application program 36 into the data points 6.1 to 6.m.

The second descriptive data 40 are generatable due to the fact that the data point 6.1 in the source data set 30 is allocated to the class "analog value class". The further descriptive data 39 and 41 to 47 result through the actual attribute values used in the source data set 30 for the instance in the "analog value class", in which, by way of example:

the first descriptive data 39 are established by the actual attribute value "151" of the first attribute "address", the third descriptive data 41 are established by the actual attribute value "air temperature" of the second attribute "name", the fourth descriptive data 42 are established by the actual attribute value "10.50" of the third attribute "lower limit" and the actual attribute value "27.50" of the fourth attribute "upper limit:, the fifth descriptive data 43 are established by the actual attribute value "21.0" of the fifth attribute "default", the sixth descriptive data 44 are established by the actual attribute value "normal" of the eighth attribute "access right", the seventh descriptive data 45 are established by the actual attribute value "event" of the ninth attribute "features", the eighth descriptive data 46 are established by the actual attribute value "true" of the tenth attribute "configuring" and the ninth descriptive data 47 are established by the actual attribute value "C" of the seventh attribute "unit".

The characterization 8 has, further, a data set for each (not represented in FIG. 3) of the data points 6.2 to 6.16, which are built up and generated in the manner represented in the example of execution for the data point 6.1.

The characterization 8 has, moreover, also first grouping data 50 and second grouping data 51. The first grouping data 50 group the first data point 6.1, the fifth data point 6.5 and the twelfth data point 6.12 of the apparatus 1 (FIG. 1) into a logically coordinated unit. In an advantageous manner the first grouping data 50 are generatable by the compiler system 31, if in the class for the first data point 6.1 and in the class for the fifth data point 6.5 and in the class for the twelfth data point 6.12 there is set, for the sixth attribute "masking", the actual attribute value of a common group—for example of the group "S".

The second grouping data 51 group the fifth data point 6.5, the seventh data point 6.7 and the fourteenth data point 6.14 of the apparatus 1 (FIG. 1) into a further logically coordinated unit.

In an advantageous manner the second grouping data 51 are generatable by the compiler system 31 if in the classes involved, as described in the case of the first grouping data So, there is set in each case, for the sixth attribute "masking", the actual attribute value of a common group, for example, of the group "D".

In an advantageous variant of execution of the characterization 8, the second grouping data 51 are generatable by the compiler system 31 if in the source data set 30 a second data set is linked with at least a part of the descriptive data 39 to 47 of the fifth data point 6.5 and a third data set is linked with at least a part of the descriptive data 39 to 47 of the seventh data point 6.7 and a fourth data set with at least a part of the descriptive data 39 to 47 of the fourteenth data point 6.14 with average operators, whereby the fifth data point 6.5 with the seventh data point 6.7 and the fourteenth data point 6.14 form a further object of the apparatus.

The grouping data 50 and 51 present in each case a predefined operating view for the application program 36, which is advantageously realized essentially data controlled, by the characterization 8 with the available grouping data 50 and 51, respectively.

Figure 4:
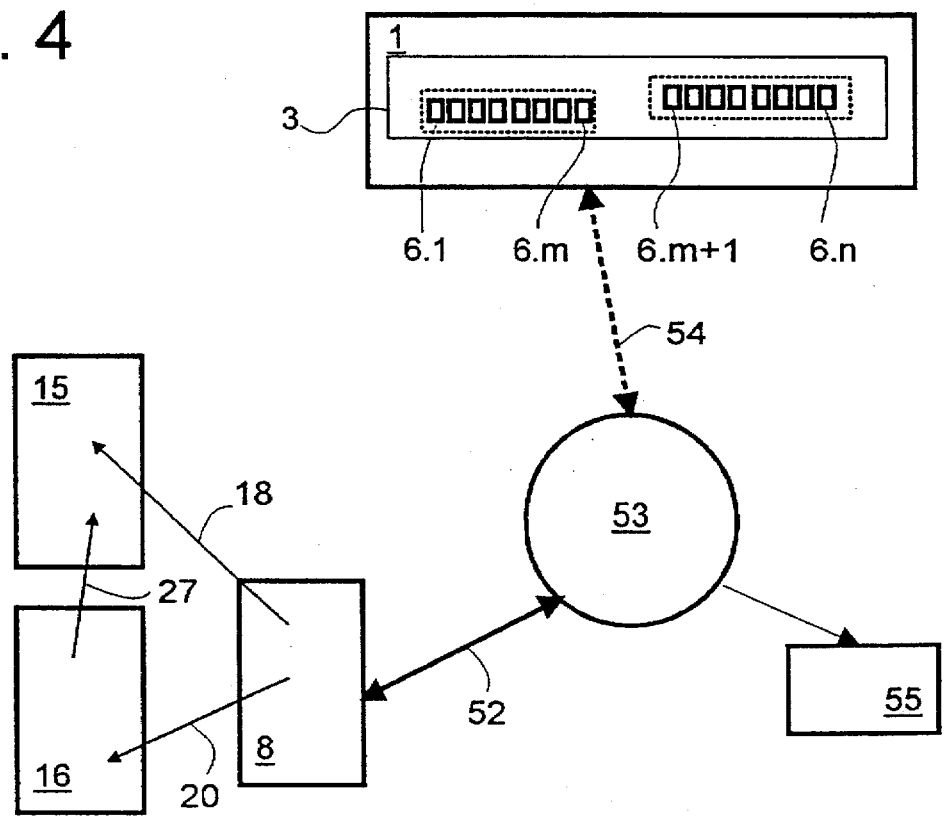

In FIG. 4, the characterization 8 is connected over a communication channel 52 serving for the data exchange with a program system 53. In a first variant of the program system 53 there is lacking a second communication channel 54; the program system 53, therefore, in the first variant is not connected with the apparatus 1. Through the first variant of the program system 53 the characterization is used for the generation of a data bank 55 dependent on the characterization 8, whereby, for example, a guidance system can be laid out largely ready for operation, without the apparatus 1 belonging to the guidance system being connected.

A second embodiment of the program system 53 is connected with the apparatus 1 over the second communication channel 54. The second embodiment of the program system 53 is a diagnosis program, which is designed for error searching or for optimation problems. Over the second communication channel 54 process data—of the apparatus 1 are readable and variable for the diagnosis program.

Through the available characterization 8, the diagnosis program is largely data-controlled and therewith simply and surely constructed.

The data arrangement which comprises, on the one hand, the data points 6.1 to 6.n and, on the other hand, the characterization 8 of the data points 6.1 to 6.n, is an advantageous means for the storing of process magnitudes of the apparatus 1 connected to the communication network 5, in which system the process magnitudes in the station 7 connected to the communication network are usable advantageously, thanks to the characterization 8 for the activity 11.

The advantageous data arrangement makes possible the storing of the characterization 8 or 9 in the station 7 and creates therewith the precondition that in the operation of the apparatus 1 or 2 an access to the apparatus 1 or 2 for the reading or changing of the process information of a data point 6.k is feasible with a minimum of data traffic on the data network 5. It is especially advantageous that also a single data point 6.k is accessible from the station 7 and that, further, with the grouping data 50 and 51, the data points 6.1 to 6.n are structurable from the view of the activity 11 or of the application program 36 or of the program system 53 according to various viewpoints.

Through the fact that for the generation of the characterization 8 or 9, a predefined class library 32 is prepared and used, through which possible degrees of freedom in the generation are restricted, a substantial improvement of the quality of apparatus 1 or 2 is achievable in which, as a result of data control by the characterization 8 or 9, the expenditure for the secure programming of the activity 11 or of the application program 36 or of the programming system 53 is much reduced. The storage space demanded by the characterization 8 or 9 does not have to be available in the apparatus 1 or 2.

While various embodiments of the present invention have been shown and described, it should be understood that various alternatives, substitutions and equivalents can be used, and the present invention should only be limited by the claims and equivalents of the claims.

Various features of the present invention are set forth in the following claims.

What is claimed is:

1. A data arrangement for an apparatus connectable to a communication network, comprising:

a plurality of data points (6.1..6.n) arranged in the apparatus for storing dynamic process information, said plurality of data points being accessible for reading and/or changing by a station connected to the communication network;

one (6.k) of said plurality of data points (6.1. . . 6.n) being an object of the apparatus; and a static characterization included in said station and having static descriptive data of said object, said static characterization being a logically correlated unit, and being accessible for reading by a processor of said station; and wherein a group (6.i.6.j) of said plurality of data points of the apparatus accessible over the communication network are further grouped into a new object by the static characterization; and wherein said static characterization further comprises:

first descriptive data for establishing an address of said object and said new object;

second descriptive data for determining a data type of said object and said new object; and third descriptive data for establishing a designation of said object and said new object.

2. A data arrangement according to claim 1, characterized in that said static characterization further comprises:

fourth descriptive data for determining a value range of said object and said new object; and fifth descriptive data for determining a standard value of said object and said new object.

3. A data arrangement according to claim 2, characterized in that said static characterization also comprises sixth descriptive data for establishing choosable access rights to said object and said new object.

4. A data arrangement according to claim 3, characterized in that said static characterization also comprises seventh descriptive data for establishing operations supported by the apparatus on said object and said new object.

5. A data arrangement according to claim 4, characterized in that said static characterization also comprises eighth descriptive data for marking said object and said new object as necessary for configuration of a certain execution manner of the apparatus.

6. A data arrangement according to claim 5, further comprising, a units catalog including physical mass units and representation formats of process magnitudes used in the communication network, said physical mass units and said representation formats being referenceable by means of points for the unification and simplification of the characterization.

7. A data arrangement according to claim 6, further comprising a text catalog including texts drafted in a certain language, said text catalog presenting said texts to person/machine interface connected to the communication network, and said texts being referenceable by means of points.

8. A data arrangement according to claim 1, wherein said static characterization also comprises sixth descriptive data for establishing choosable access rights to said object and said new object.

9. A data arrangement according to claim 8, wherein said static characterization also comprises seventh descriptive data for establishing operations supported by the apparatus on said object and said new object.

10. A data arrangement according to claim 9, wherein said static characterization also comprises eighth descriptive data for marking said object and said new object as necessary for configuration of a certain execution manner of the apparatus.

11. A data arrangement according to claim 10, further comprising, a units catalog including physical mass units and representation formats of process magnitudes used in the communication network, said physical mass units and said representation formats being referenceable by means of points for the unification and simplification of the characterization.

12. A data arrangement according to claim 11, further comprising a text catalog including texts drafted in a certain language, said text catalog presenting said texts to person/machine interface connected to the communication network, and said texts being referenceable by means of points.

13. A data arrangement according to claim 1, further comprising, a units catalog including physical mass units and representation formats of process magnitudes used in the communication network, said physical mass units and said representation formats being referenceable by means of points for the unification and simplification of the characterization.

14. A data arrangement according to claim 13, further comprising a text catalog including texts drafted in a certain language, said text catalog presenting said texts to person/machine interface connected to the communication network, and said texts being referenceable by means of points.

15. A data arrangement according to claim 1, further comprising a text catalog including texts drafted in a certain language, said text catalog presenting said texts to person/machine interface connected to the communication network, and said texts being referenceable by means of points.

* * * * *

UNITED STATES PATENT AND TRADEMARK OFFICE
CERTIFICATE OF CORRECTION

PATENT NO. : 5,712,980
DATED : January 27, 1998
INVENTOR(S) : Beeler et al.

It is certified that error appears in the above-identified patent and that said Letters Patent is hereby corrected as shown below:

In the Abstract, line 2, delete "comprises" and insert
--includes--.

Column 4, line 15, change "3 5" to --35--.

Signed and Sealed this

Eighth Day of September, 1998

Attest:

BRUCE LEHMAN

Attesting Officer    Commissioner of Patents and Trademarks